(12) United States Patent (10) Patent No.: US 8,164,277 B2
Stevn (45) Date of Patent: Apr. 24, 2012

(54) LED SYSTEM FOR PRODUCING LIGHT

(75) Inventor: Palle Stevn, Aalborg SV (DK)

(73) Assignee: Modilis Holdings LLC, Wilmignton, DE (US)

( * ) Notice: Subject to any disclaimer, the term of this patent is extended or adjusted under 35 U.S.C. 154(b) by 184 days.

(21) Appl. No.: 12/343,161

(22) Filed: Dec. 23, 2008

(65) Prior Publication Data

US 2009/0212707 A1 Aug. 27, 2009

Related U.S. Application Data

(63) Continuation of application No. 10/528,023, filed as application No. PCT/DK2003/000597 on Sep. 16, 2003, now abandoned.

(30) Foreign Application Priority Data

Sep. 16, 2002 (DK) ................................ 2002 01362

(51) Int. Cl.
*G05F 1/00* (2006.01)
(52) U.S. Cl. ........ 315/307; 315/294; 315/291; 315/149; 315/309; 315/312; 362/613; 362/612
(58) Field of Classification Search .................. 315/312, 315/307, 308, 149–159, 112–120, 291, 224, 315/318, 294, 297, 300, 302, 309; 362/612, 362/613, 800
See application file for complete search history.

(56) References Cited

U.S. PATENT DOCUMENTS

| | | | |
|---|---|---|---|
| 3,705,316 A | 12/1972 | Burrous et al. | |
| 5,334,916 A | 8/1994 | Noguchi | |
| 5,783,909 A | 7/1998 | Hochstein | |
| 6,012,291 A | 1/2000 | Ema | |
| 6,028,694 A | 2/2000 | Schmidt | |
| 6,127,783 A | 10/2000 | Pashley et al. | |
| 6,234,645 B1 | 5/2001 | Börner et al. | |

(Continued)

FOREIGN PATENT DOCUMENTS

EP 0 407 065 A2 1/1991

(Continued)

OTHER PUBLICATIONS

Non-final office Action U.S. Appl. No. 10/528,023 dated Jun. 30, 2008.
Brochure from LUXEON: "ABO5 Thermal Design Considerations for Luxeon Power Light Sources", retrieved on Apr. 15, 2011 at <<http://www.theledlight.com/pdf/Luxeon1-19.pdf>>, 19 pages.

(Continued)

*Primary Examiner* — Haissa Philogene
(74) *Attorney, Agent, or Firm* — Lee & Hayes, PLLC

(57) ABSTRACT

The invention relates to a system comprising a plurality of light emitting diodes, LEDs. The LEDs may be controlled in various in various manners in order to obtain any of one or more objects of the system. Thus, LEDs may be controlled for by controlling at least two of the following parameters: the luminous intensity of each of the LEDs, the luminous flux of each of the LEDs, the colour spectrum of the light being emitted from each of the LEDs, the spatial radiation pattern of the light being emitted from each of the LEDs, the spatial radiation pattern of the system, the junction temperature of each of the LEDs, the temperature of the surroundings to the LED, the amperage of the electrical power being supplied each or sections of the LEDs, the voltage of the electrical power being applied the LEDs and pulsing applied to the electrical power being applied each or sections of the LEDs.

17 Claims, 7 Drawing Sheets

U.S. PATENT DOCUMENTS

| | | | |
|---|---|---|---|
| 6,441,558 B1 | 8/2002 | Muthi et al. | |
| 6,448,550 B1 | 9/2002 | Nishimura | |
| 7,008,078 B2 * | 3/2006 | Shimizu et al. | 362/231 |
| 7,573,209 B2 * | 8/2009 | Ashdown et al. | 315/307 |
| 7,663,326 B2 * | 2/2010 | Santo et al. | 315/309 |

FOREIGN PATENT DOCUMENTS

| | | |
|---|---|---|
| EP | 0 516 398 A | 12/1992 |
| EP | 1 152 642 A | 11/2001 |
| EP | 1 341 276 A1 | 9/2003 |
| GB | 2 224 374 A | 5/1990 |
| GB | 2 369 730 A | 6/2002 |
| JP | 6-138351 | 5/1994 |

OTHER PUBLICATIONS

Brochure from LUXEON: "Application Brief ABO7 Lumen Maintenance of White Luxeon—Power Light Sources", retrieved on Apr. 15, 2011 at <<http://www.theledlight.com/pdf/042004/ABO7LuxeonLumenMaintenance.pdf>>, 5 pages.

Brochure from LUXEON: "Technical Data Luxeon Emitter", retrieved on Apr. 15, 2011 at <<http://www.sparkfun.com/datasheets/Components/Luxeon-l.pdf>>, 19 pages.

International Search Report of PCT/DK03/00597, mailed Mar. 8, 2004, 3 pages.

The response filed in EP Patent Application 03794829.6, dated Nov. 23, 2011, 5 pages.

* cited by examiner

LED SYSTEM FOR PRODUCING LIGHT

TECHNICAL FIELD OF THE INVENTION

The present invention relates to a system of light-emitting diodes (LEDs) for producing light. By the use of different control strategies the colour spectrum of the light produced, the luminous intensity, the luminous flux and the spatial radiation pattern of the light produced may be controlled.

BACKGROUND OF THE INVENTION

U.S. Pat. No. 6,234,645 describes a system comprising at least four light-emitting diodes for the production of white light. The colour rendering index is above 60 and the luminous efficacy is preferably above 30 lm/W. In one embodiment, the colour temperature of the light can be adjusted by selectively switching the light-emitting diodes.

U.S. Pat. No. 5,783,909 describes a system for maintaining the luminous intensity of the light from at least one light-emitting diode. The system comprises a power supply electrically connected to the light-emitting diode for supplying pulses of electrical energy to this light-emitting diode. By adjusting the electrical energy supplied the luminous intensity of the light-emitting diode can be maintained at a preselected level, thereby compensating for the diminution of the output due to e.g. temperature variations or ageing.

U.S. Pat. No. 6,012,291 describes a system for temperature control of an optical semiconductor device, e.g. a light-emitting diode. By attaching the semiconductor device to a thermal conductor the temperature of this optical semiconductor device is kept at a constant temperature level despite any influence of the ambient temperature, heat sources etc.

SUMMARY OF THE INVENTION

It is an object of the present invention to provide a system capable of controlling the light emitting diodes (LED) and thus of the light being emitted from such a system, and which control enables adjustment of more than just one parameter in order to optimise the system. It is also an object of the present invention to provide an apparatus for emitting light by using LEDs, and where the lifetime of the LEDs and the luminous intensity, the luminous flux and the optical efficiency may be increased.

This object may be obtained by a method comprising controlling at least two of the following parameters: the luminous intensity of each of the LEDs, the luminous flux of each of the LEDs, the colour spectrum of the light being emitted from each of the LEDs, the spatial radiation pattern of the light being emitted from each of the LEDs, the spatial radiation pattern of the system, the junction temperature of each of the LEDs, the temperature of the surroundings to the LED, the amperage of the electrical power being supplied each or sections of the LEDs, the voltage of the electrical power being applied the LEDs and pulsing applied to the electrical power being applied each or sections of the LEDs.

The object may be obtained by a system comprising means for measuring the luminous intensity of light being emitted from said system, and said system further comprising means for controlling the luminous intensity of each or of sections of the LED separately.

The object of the invention may also be obtained by a system comprising means for measuring the colour spectrum of light being emitted from said system, and said system further comprising means for controlling the luminous intensity of each or of sections of the LEDs separately.

The object of the invention may also be obtained by a system comprising means for measuring the luminous intensity of light being emitted from said system, and said system further comprising means for controlling the spatial radiation pattern of each or of sections of the LEDs separately.

The object of the invention may also be obtained by a system comprising means for measuring the colour spectrum of light being emitted from said system, and said system further comprising means for controlling the spatial radiation pattern of each or of sections of the LEDs separately.

The object of the invention may also be obtained by a system comprising means for measuring the luminous intensity of light being emitted from the system, and said system further comprising means for controlling the surrounding temperature of each or of sections of the LEDs separately.

The object of the invention may even also be obtained by a system comprising means for controlling the junction temperature of each of the LEDs separately, and said system further comprising means for controlling the surrounding temperature of the LEDs.

The object of the invention may even also be obtained by a system comprising means for measuring the surrounding temperature of said LEDs, and said system further comprising means for controlling the surrounding temperature of said LEDs.

The object of the invention may even also be obtained by a system comprising means for measuring the electrical power applied LEDs, and said system further comprising means for controlling the surrounding temperature of said LEDs.

The object of the invention may even also be obtained by a system comprising means for measuring the electrical power applied LEDs, and said system further comprising means for controlling the electrical power applied to said LEDs.

A system according to the invention may comprise one or more of the following elements: control means for controlling the luminous intensity of the LEDs, control means for controlling the colour spectrum of the light being emitted from each of the LEDs, control means for controlling the surrounding temperature of each of the LEDs and control means for controlling the pulse of the electrical power being supplied to each of the LEDs.

Controlling the luminous intensity of each or of sections of the LEDs establishes a means for controlling the dominants of one or more wavelengths in a colour spectrum in question in relation to more or less complementary colours to the colour or colour spectrum in question. The luminous intensity is preferably controlled by controlling each of or sections of LEDs. Controlling the colour spectrum of each of the LEDs establishes a means for controlling the overall colour being emitted from the system, i.e. controlling the colour compared to a colouring scheme for instance as the CIE chromaticity diagram. The colour is preferably controlled by controlling the colour of at least three wavelengths. Controlling the spatial radiation pattern of the system, establishes a means for controlling the luminous intensity being emitted from the system, and/or from each of the LEDs. Controlling the colour spectrum and/or the luminous intensity of each or of sections of the LEDs establishes a means for controlling the overall colour spectrum being emitted from the system, i.e. controlling the colour compared to a colouring scheme. The colour spectrum may be controlled by controlling the colour spectrum and/or the luminous intensity of one or more individual LEDs. The LEDs is capable of emitting light for instance blue, green and red colour area, respectively. Alternatively, the colour spectrum may be controlled by controlling the dominants of one or more wavelengths or the colour spectrum of one or more LEDs, each LED capable of emitting light at different wavelength or different colour spectrums.

Controlling the surrounding temperature, either of each of the LEDs or commonly of all of the LEDs, establishes a means for controlling the luminous intensity being emitted from the system, i.e. controlling the luminous flux of each or of sections of the LEDs. Controlling the luminous flux of each of the LEDs, establishes a means for controlling the capacity of light being emitted from the system. When controlling the surrounding temperature of the LED the lifetime and the optical efficiency may be increased.

Controlling the electrical power being supplied to each of the LEDs establishes a means for controlling the lifetime and optical efficiency and furthermore preventing thermal runaway of the LEDs, i.e. controlling the duration of LEDs given certain criteria such as colour spectrum and luminous intensity being emitted by each or sections of the LEDs. The electrical power is either controlled by controlling amperage or voltage of the electrical power, and/or by controlling the pulse of the electrical power, i.e. the duty factor of the electrical power.

BRIEF DESCRIPTION OF THE DRAWINGS

The invention will now be described with reference to the accompanying drawing, where.

DETAILED DESCRIPTION OF THE INVENTION

Figure 1:
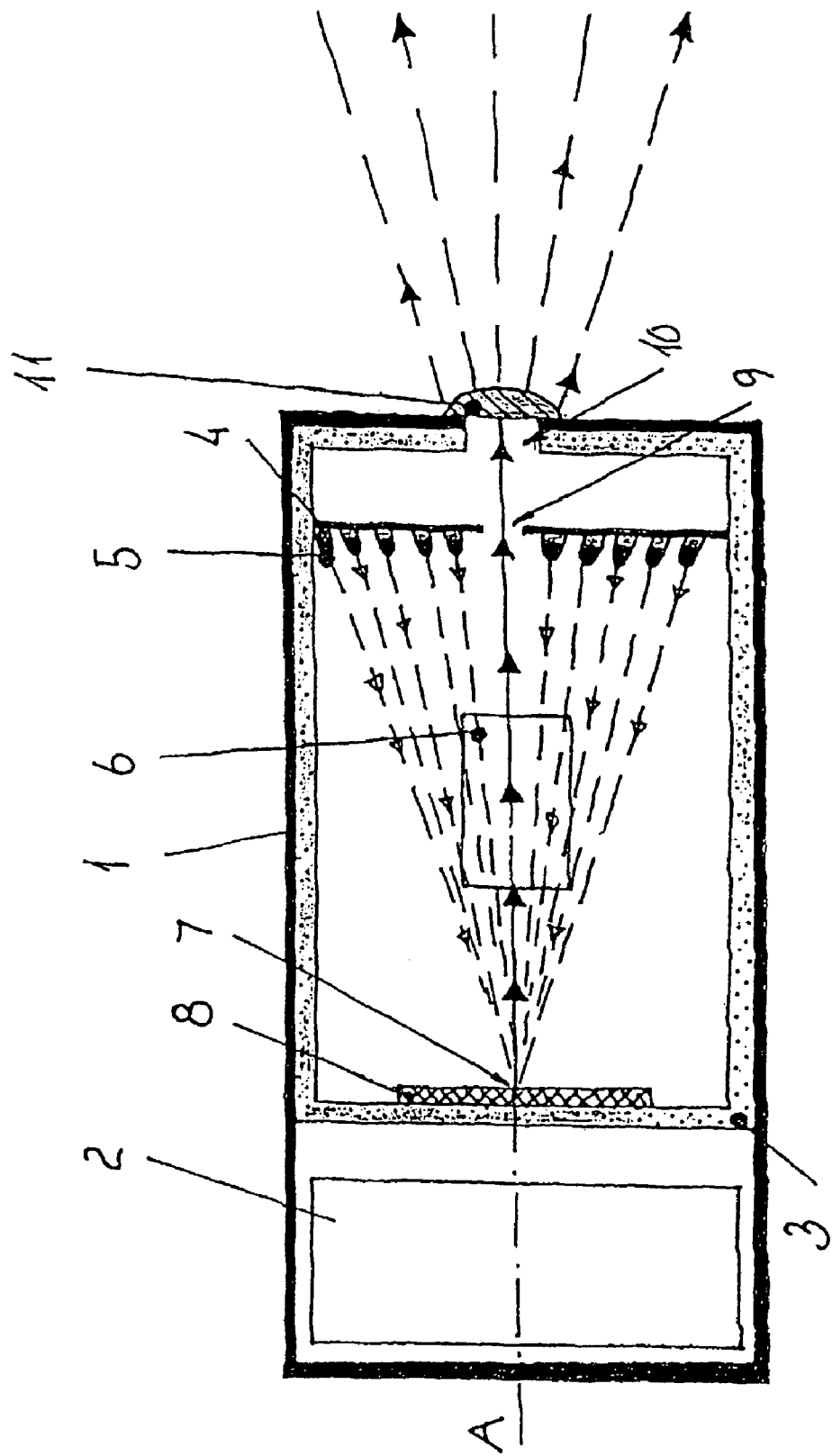
FIG. 1 shows a casing for an embodiment of an apparatus according to the invention

FIG. 1 shows in principle a system for illumination by means of LEDs. A housing 1 consists of a box containing different elements for illumination. Firstly, an electrical and electronic element 2 is provided at the left side of the housing, said element controlling the emission of light from the LEDs. An insulation 3 is provided within the housing, and a number of other element are provided within the insulation.

An array 4 of LEDs 5 is provided at the right side of the housing. Also, a cooling element 6 is provided centrally in the insulation 3 with a cool side of the cooling element 6 having contact to the gas contained within the interior of the insulation. Light emitted from the LEDs is directed from the array to the left and towards a central line A of the housing. In a focal point 7 of the light emitted from the LEDs, a reflector 8 such as a mirror is provided. The light emitted from the LEDs is directed along the central line A of the housing through a central hole 9 in the array 4, through a hole 10 in the insulation 3 and through a lens 11 in the housing 1 and out of the housing. In the embodiment shown, the lens 11 is a divergent concave lens. However, the lens could also be a convex lens for collecting the light, if the light after having been reflected by the reflector is not precisely focused by the reflector. Apart from the elements mentioned, also a thermal element (see FIG. 4) is assigned to the housing, however, preferably provided on the outer side of the housing.

Figure 2:
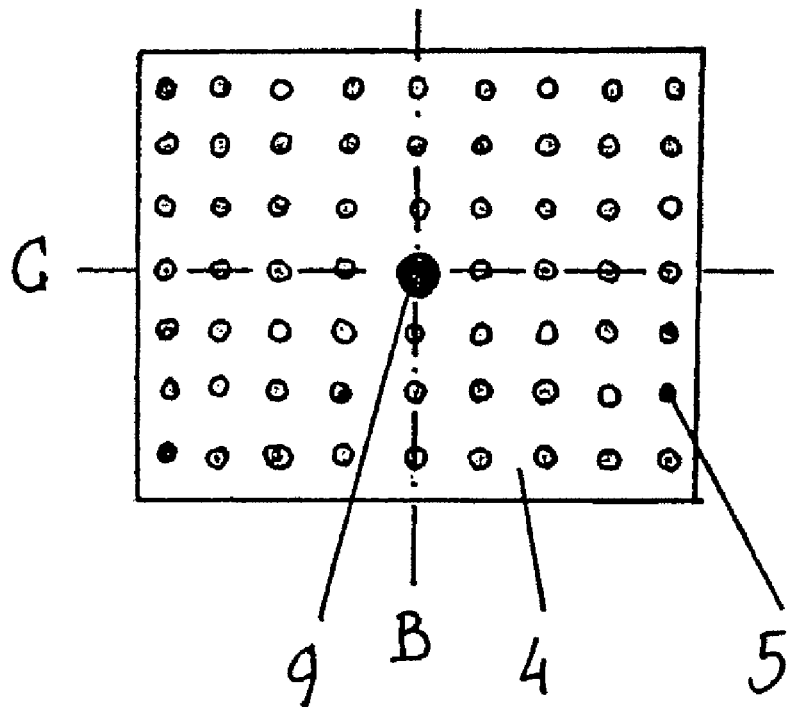
FIG. 2 shows an array of LEDs constituting part of the apparatus.

FIG. 2 shows a possible embodiment of an array 4 of LEDs 5, said array 4 suited for a housing 1 having a square cross-sectional area. The LEDs 5 are provided around the central hole 9, and the different LEDs 5 have different colours so that different colours are possible to emit from the system. The differently coloured LEDs 5 are provided symmetrically on each side of a vertical symmetry line B or on each side of a horizontal symmetry line C through the central hole 9. Alternatively, the differently coloured LEDs are provided symmetrically on each side of both a vertical symmetry line 8 and a horizontal symmetry line C.

In FIG. 1 and in FIG. 2 both the reflector and the array of LEDs are shown as being planar. However, in an alternative and preferred embodiment, the array of LEDs is curved with a concavity directed towards the reflector. As shown in FIG. 1, the LEDs have to be diverted towards the reflector.

Figure 3:
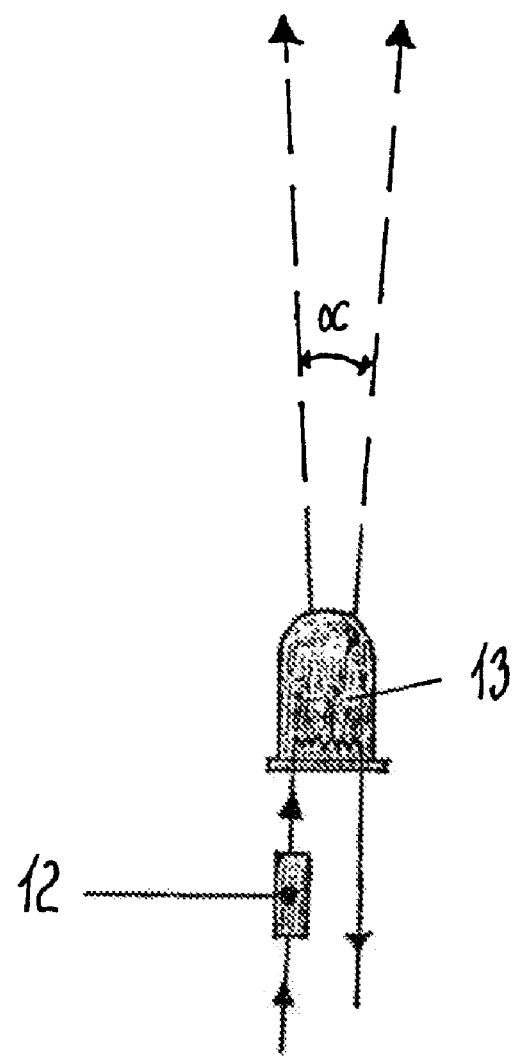
FIG. 3 shows an LED constituting part of the array of these diodes.

Also, in an alternative and preferred embodiment, the reflector is slightly curved with a concavity directed towards a focal point of the reflector. Although the intention is that the LEDs all are directed towards the focal point, then it must be remembered that the LEDs emit light along a certain angular extension, perhaps 12° as shown in FIG. 3. This results in that also light outside the focal point will be emitted. In order to collect the beams of light emitted from one focal point, the reflector may have a parabolic curvature for focussing the light at the lens before the light is emitted trough the lens.

Preferably, both the array of LEDs and the reflector are curved as explained above so that a synergetic effect is obtained: Both the effect of the LEDs being directed towards the focal point of the reflector without having to bend the legs of the LEDs, and the effect of the reflector collecting the light being emitted from the LEDs before transmitting the light to the lens and through the lens.

FIG. 3 shows an LED 5 as commonly known. The LED is powered by a voltage and an amperage. The current is applied to the LED by being directed firstly through a resistor 12 and subsequently through the coloured glazing 13 of the LED and thus resulting in light being emitted. The purpose of the resister 12 is for example to prevent thermal runaway by controlling the current. In the embodiment shown, the LED 5 emits most of the light in an angle $\alpha$ of 12°. Other types of LEDs are possible to use according to the application and use of the system, i.e. according to the colour spectrum of the light intended for being emitted and according to the luminous intensity and the optical efficiency intended for being emitted from the housing.

Figure 4:
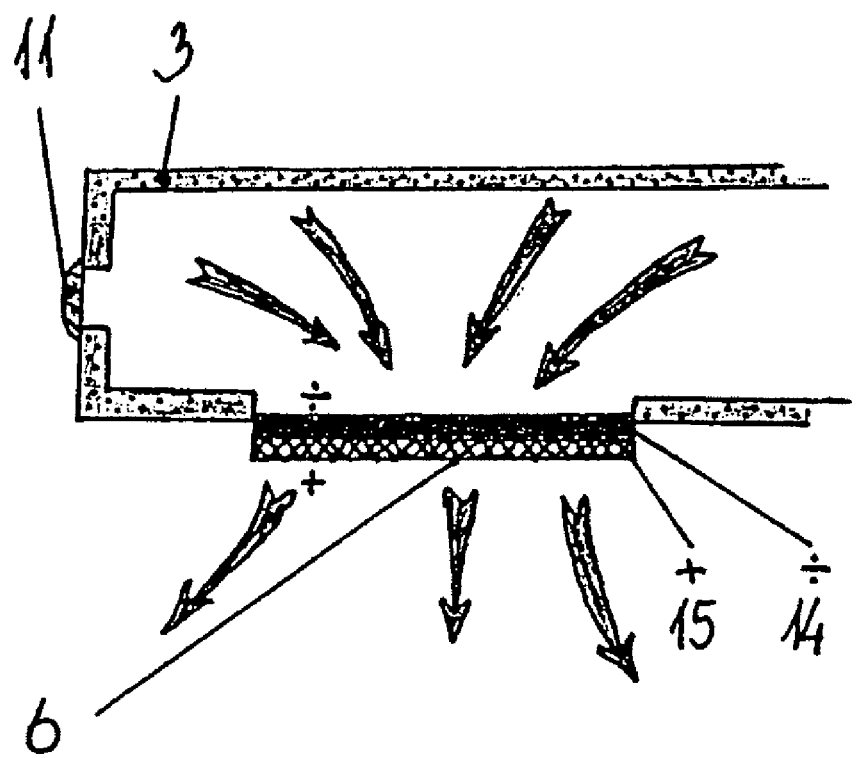
FIG. 4 shows in principle a cooling unit constituting part of the apparatus

FIG. 4 shows schematically a cooling element 6 for cooling a gas contained within the insulation 3 in the housing 1. In the embodiment shown, the cooling element is a Peltier-element of commonly known type. The Peltier element cools the gas within the insulation in the housing by having the cool side 14 of the Peltier element provided at the inner side of the housing, and the Peltier-element emits the heat generated during cooling to the outside surroundings of the housing by having the hot side 15 at the outer side of the housing. As shown also in FIG. 1, the Peltier element is provided at the one side of the housing and constitutes part of the housing wall. Preferably, the hot side 15 of the Peltier-element is provided with cooling fins for increasing the cooling of the hot side by the surroundings. The hot side 15 of the Peltier element will in special applications such as out-door lighting be directed downwards so that possible water from snow melting will not gather on the hot side and possibly limit the possibility of the surroundings of cooling the hot side of the Peltier-element, but water will drip off the hot side of the Peltier element.

Apart from the elements shown, the apparatus is preferably also provided with means (not shown) for establishing a vacuum inside the housing. The means for establishing the vacuum may be any exteriorly applied means capable of establishing a vacuum sufficient to provide a vacuum of a certain chosen magnitude depending on the application and use of the apparatus.

Figure 5:
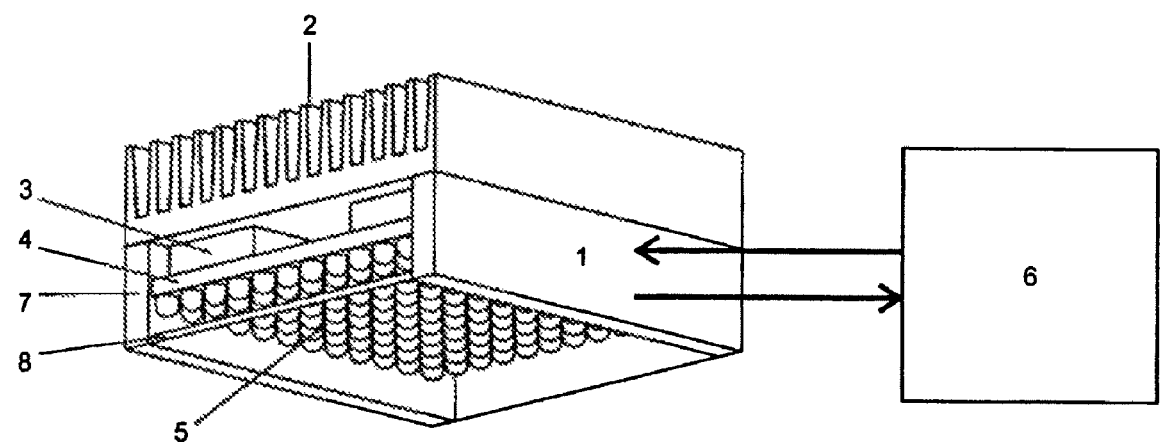
FIG. 5 shows an embodiment of a casing for an apparatus according to the invention.

FIG. 5 shows in principle another embodiment of a system for illumination by means of LEDs. The housing 1 consists of a box containing different elements. Firstly, electrical and electronic elements 6 is provided outside or inside of the housing, said elements controlling different parameters for the emission of light from the LEDs 5 and the cooling devices 3. Arrays of LEDs 5 are provided inside the housing on a mounting plate 4.

Also, one or more cooling elements, e.g. Peltier elements 3, are provided centrally on the other side of the LED mounting plate with a cold side of the cooling devices being in thermal contact with the mounting plate, and a hot side of the cooling devices being in thermal contact with the heat sink 2. Light emitted from the LEDs is directed through optics 8. Said optics is dependent on the LEDs viewing angle and/or the total spatial radiation pattern. One or more optical detectors can be placed near or in the visual vicinity of the light being emitted from LEDs, e.g. inside or outside the housing.

Insulation 7 may be provided within the housing and is intended for preventing heat transfer from the ambient surroundings and into the interior of the housing. The insulation may be any kind of insulation suited for the purpose, depending on the application and use of the apparatus and depending on the outer surroundings of the housing in relation of a temperature difference between the ambient temperature and the temperature in the interior of the housing. In order of minimising the power used in the cooling system a specially chosen gas and/or perhaps a vacuum may be established within the housing.

Figure 6:
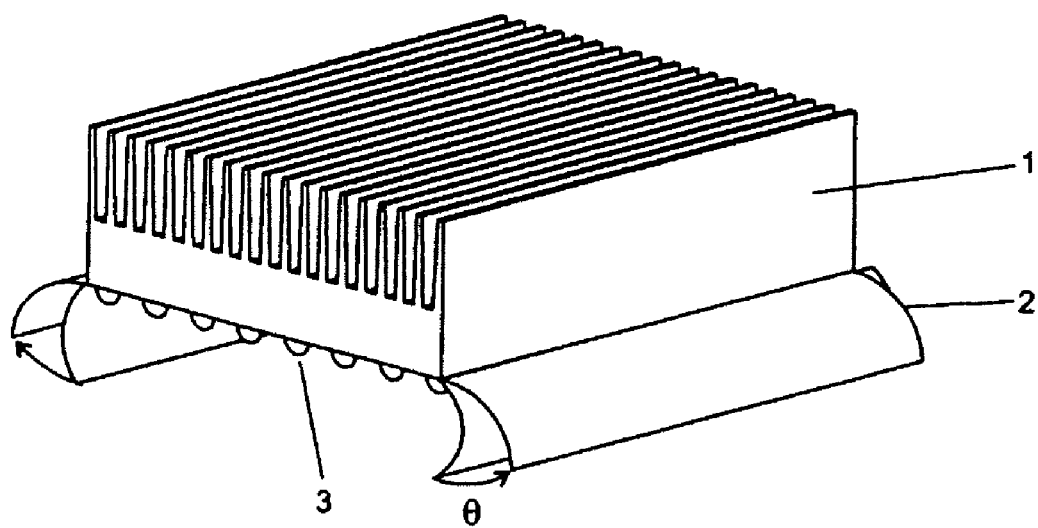
FIG. 6 shows the casing of said apparatus and said casing provided with reflectors.

FIG. 6 shows a principle of controlling the spatial radiation pattern by using two reflectors 2 outside the housing 1. Another number of reflectors and/or reflectors having a different shape and configuration may be provided. The width of the light beam being emitted and the spatial radiation pattern are depending on the optic and of the viewing angle of the LEDs 3, and of reflectors 2. By controlling the reflectors the spatial radiation pattern can be altered. One or more reflectors may be mounted outside the housing. Said reflectors can also be mounted inside the housing e.g. placed around each LED or around sections of LEDs.

In FIG. 5 and in FIG. 6 both the reflector and the LEDs are shown as being planar. However, in an alternative and preferred embodiment, the reflector and/or the LEDs could be curved shaped with a concavity.

Figure 7:
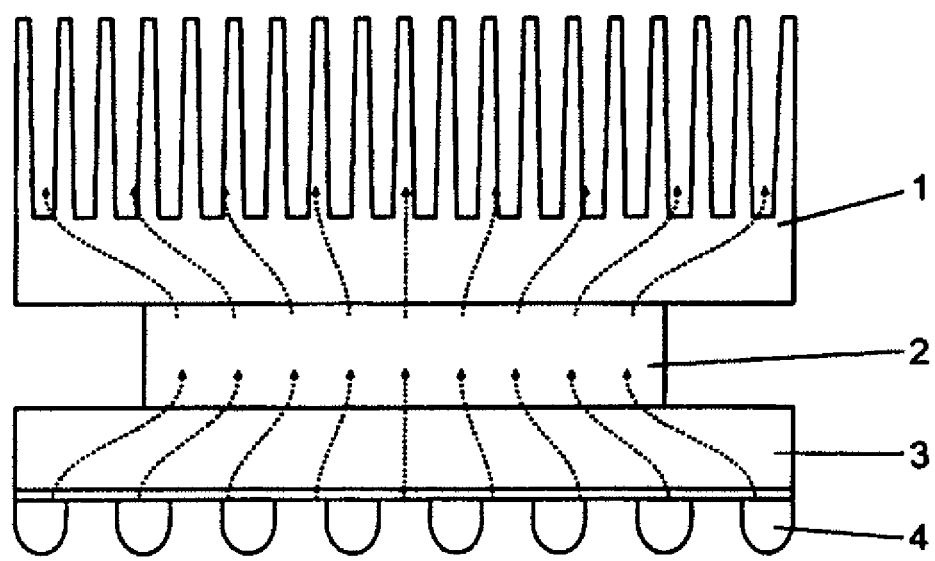
FIG. 7 shows an embodiment of cooling unit constituting part of the apparatus.

FIG. 7 shows the heat transfer principle of a cooling device for cooling the surrounding temperature of the LEDs. Said cooling device 2 is e.g. Peltier element of commonly known type. The Peltier element is intended for cooling the LEDs 4 indirectly by cooling the LED's surroundings in the interior of the housing. Preferable, the LEDs are mounted on an aluminium plate 3. The aluminium mounting plate 3 then transfers the heat from the junction of the LEDs 4 with the aluminium plate 3 and from the inside of the housing to the Peltier elements 2. The hot side of the Peltier element is provided with a heat sink 1 for increasing the heat transfer of the hot side with the surrounding environment. The Peltier elements then transports the heat generated during cooling to a heat sink. One or more thermal detectors may be placed near the LEDs, e.g. on the aluminium plate.

In the following, the interaction between the different elements will be described.

The electrical and electronic element 6 is intended for controlling the LEDs. Control of the LEDs comprises control of the electrical current applied to the LEDs, control of which LEDs that are to be lit, control of at which moment of time each of the LEDs is to be lit and control of which periods of time each of the LEDs is to be lit. Possibly, the control of the period of time which each of the LEDs is lit may be established by a constant current or by pulsation applied to the LEDs.

The luminous intensity is decreasing during the lifetime of the LEDs, and by controlling the luminous intensity of the LEDs, a constant luminous intensity during the lifetime can be obtained. By controlling the luminous intensity from each or sections of LEDs, a constant colour spectrum can also be obtained.

The electrical and electronic element is also intended for controlling the inner temperature of the housing by controlling the cooling device. By decreasing the junction temperature of the LED the optical efficiency will be increased and the lifetime prolonged. The limit of the temperature inside the housing is depending of the temperature limits of the LEDs according to the specification.

The electrical and electronic element 6 is also intended for controlling the cooling system by controlling the Peltier elements. Control of the Peltier elements comprises control of the electrical current and voltage applied the Peltier elements, control of at which periods of time Peltier elements are to be more or less active. Possibly, the control of the period of time each of the Peltier elements are active may be established by variable DC.

The reflectors are also controlled by the electrical and electronic element 6. By controlling each or sections of the reflectors and/or using optics, the emitting light from the LEDs can be directed in a desired or needed direction. The spectral radiation pattern can be symmetric or asymmetric, depending on the application and use of the apparatus.

The resistor, which constitutes part of the LED (see FIG. 3), is preferably situated together with the electronic element. The resistor produces heat, and it is not desirable to having the heat being emitted within the insulation, because the gas contained within the insulation is subjected to cooling. Heat from the resistors will contravene such cooling.

The insulation is intended for insulating the gas within the insulation towards any heat transfer from the outside surroundings of the housing. The insulation may be any kind of insulation suited for the purpose, depending on the application and use of the apparatus and depending on the outer surroundings of the housing. Thus, the insulation may be polystyrene, it may be any insulation material such as the commonly known insulation woollen materials based on rock or based on glass, it may be other materials suited for insulation purposes and capable of assisting in a maintaining of a certain temperature within the insulation in the housing despite the risk or possibility of possible heat transfer from the outer surroundings of the housing due to a temperature difference.

The cooling element, in the embodiment shown the Peltier-element, is, as mentioned, intended for cooling the gas within the insulation of the housing. Cooling of the gas may take place by cooling the gas to a constant or variable temperature depending on the application and use of the system.

The possible means for establishing the vacuum is intended for subjecting the gas contained within the insulation to vacuum or perhaps subjecting the gas contained within the entire housing to vacuum.

Thus, if the volume of the housing or the volume within the insulation is constant, then, if the pressure is decreased by the exteriorly applied vacuum means, then the amount of moles is decreased correspondingly. However, an advantage may be obtained, when initially subjecting the gas to a vacuum. If the temperature inside the housing, after having been subjected to a vacuum, is decreased, then the amount of moles to be cooled is much less, and thus the amount of energy for cooling the gas contained within the insulation is decreased accordingly.

Given a desire or a need to decrease the temperature to a certain low level, then the amount of electrical energy to be used for driving the Peltier-element may be less than if the gas contained within the insulation is not subjected to vacuum initial to cooling the gas. Alternatively, given a certain amount of electrical energy available to drive the Peltier-element, then the low temperature, which it may be desirable of needed to reach, may be lower than if the gas is not subjected to vacuum initially to cooling the gas.

However, depending on the low temperature, which it is desirable or needed to be reach, then the initial subjection of vacuum to the gas contained within the insulation may be suspended with. This may be the case, if the gas contained within the insulation has a low specific heat, or if the temperature of the atmosphere surrounding the housing is sufficiently low, perhaps during a winter season, compared to the temperature needed.

Other ways of controlling the LEDs will hereafter be described. The LEDs may be subjected to an on/off pulsation in order to increase the luminous intensity of the light being emitted. This pulsation may preferably be effected as a square wave pulsation, where a certain current is applied to individually chosen LEDs of the array of LEDs, where said current is maintained at a certain level for a certain amount of time, and where the current is cut off subsequent to the certain amount of time, thereby resulting in an extinguishing of the LED. However, other waveforms such as a sinusodially shaped waveform or other waveforms such as a triangularly shaped waveform may be applied in stead of a square waveform.

Most preferred, the square wave pulsation is applied so that an overlap between applied currents to the individual LEDs is obtained. Thus, just before the applied current at a certain level is cut off for one LED, then the next LED to be subjected to the current is being applied the current. Thus, an overlap is established between the cut-off of the current of one LED and the application of current to another LED. This overlap reduces the risk of the total array of LEDs emitting a flickering light. This could however be the case due to a possible delay between the cut-off of current to one LED, thereby extinguishing the LED, and before another LED is applied current for that other LED to emit light corresponding to the light just having been emitted previously by the one LED.

Another way of controlling the light emitted from the LED may be to subject the LEDs to an ever increasing level of current along with the lifetime of the LEDs running out. It is commonly known that the luminous intensity of LEDs decrease gradually during their lifetime. This may be dealt with by increasing the current applied to the LEDs in order to constantly, during the lifetime of the LEDs, maintaining a luminous intensity of 100%.

This may however decrease the lifetime of the LEDs compared to not increasing the current during their lifetime, because of the fact that the lifetime of the LEDs also depends on the level of current applied to the LEDs. Thus, if the current is constantly increased, the lifetime of the LEDs will be reduced. Alternatively to maintaining a luminous intensity of 100% during the entire lifetime of the LEDs, a lower luminous intensity may be the limit desirable to maintain, however, the limit still being greater than the limit possible to obtain, if the current applied is not increased during the lifetime of the LEDs.

The system may be used in many applications for many different uses. Major application may be outdoor lighting, show-lights and central domestic or office lighting, where a number of centrally installed systems according to the invention is used to supply light to a plurality of locations by transmitting the light along fibre-optical cables.

The invention claimed is:

1. A method for controlling light being emitted from a light-emitting system comprising a plurality of light emitting diodes (LEDs), said method comprising controlling at least the following parameters: the temperature of the surroundings of each of the LEDs, a luminous flux of each of the LEDs, and an electrical power being supplied to each of the LEDs, and where controlling the surrounding temperature controls a luminous intensity being emitted from the system, thus controlling the luminous flux of the LEDs, and controlling the electrical power does not decrease the lifetime of the LEDs by the current of the electrical power not being increased during the lifetime of the LEDs.

2. A method according to claim 1, wherein luminous intensity of the system is controlled by adjusting the one or more of the parameters amperage, voltage or duty factor of the electrical power supplied.

3. A method according to claim 1, wherein luminous intensity of the system is controlled by said power supply by introducing a pulse width from the electrical power supplied to the LEDs.

4. An LED system comprising:
a plurality of light emitting diodes (LEDs) for producing light, wherein each or sections of the LEDs are emitting light at different wavelengths;
a cooling element to control a temperature surrounding one or more LEDs of the plurality of LEDs; and
an electrical and electronic element to control an electrical power being supplied to one or more LEDs of the plurality of LEDs;
wherein controlling the electrical power does not increase the current, of the electrical power during the lifetime of the LEDs for thereby not decreasing the lifetime of the LEDs; and
wherein the controlling of the temperature by the cooling element and the controlling of the electrical power by the electrical and electronic element are effective to control the luminous flux of one or more LEDs of the plurality of LEDs.

5. An LED system according to claim 4, where at least some of the LEDs are emitting light at different wavelengths, the wavelengths including a first wavelength in the range of 430 nm to 490 nm, a second wavelength in the range of 530 nm to 565 nm, and a third wavelength in the range of 605 nm to 630 nm.

6. An LED system according to claim 4, wherein at least some of the LEDs are emitting light at different wavelengths, and said system further comprising:
a thermal detector for measuring the junction temperature of one or more LEDs of the plurality of LEDs and for sending a temperature signal;
and wherein the cooling element further controls the junction temperature of said LEDs with use of the temperature signal.

7. An LED system according to claim 6, where at least some of the LEDs are emitting light at different wavelengths, the wavelengths including a first wavelength in the range of 430 nm to 490 nm, a second wavelength in the range of 530 nm to 565 nm, and a third wavelength in the range of 605 nm to 630 nm.

8. An LED system according to claim 4, wherein at least some of the LEDs are emitting light at different wavelengths, and said electrical and electronic element is further to measure the electrical power applied to the LEDs, and wherein the electrical and electronic element is to control the electrical power being applied by applying a current as a square wave current.

9. An LED system according to claim 8, where at least some of the LEDs are emitting light at different wavelengths, the wavelengths including a first wavelength in the range of 430 nm to 490 nm, a second wavelength in the range of 530 nm to 565 nm, and a third wavelength in the range of 605 nm to 630 nm.

10. An LED system according to claim 4, where a cool side of the cooling element is facing an interior of a housing containing one or more LEDs of the plurality of LEDs, and where a hot side of the cooling element is facing exterior surroundings of the housing.

11. An LED system according to claim 4, where the hot side of the cooling element includes heat transfer means to increase the heat transfer between the cooling element and surroundings of the hot side.

12. An LED system according to claim 4, where the cooling element comprises a Peltier element, a heat exchanger of a compressed gas cooling system, or a flow of fluid or gas.

13. An LED system according to claim 4, wherein said system further comprises a vacuum unit for controlling the gas pressure within a housing containing one or more LEDs of the plurality of LEDs.

14. An LED system according to claim 4, wherein said system further comprises a gas unit for controlling the amount of gas contained within a housing containing one or more LEDs of the plurality of LEDs.

15. An LED system according to claim 4, wherein said system further comprises a gas unit for controlling the composition of the gas contained within a housing containing one or more LEDs of the plurality of LEDs.

16. An LED system according to claim 4, wherein the controlling of the temperature by the cooling element and the controlling of the electrical power by the electrical and electronic element is effective to control the luminous flux of the overall system.

17. An LED system according to claim 4, wherein the electrical and electronic element is to control the electrical power being applied by applying a current as a square wave current that establishes overlap between a current being applied initially to one LED of the plurality of LEDs and a current being applied subsequently to another LED of the plurality of LEDs.

* * * * *